United States Patent
Shin

(10) Patent No.: US 10,642,534 B2
(45) Date of Patent: May 5, 2020

(54) DATA STORAGE DEVICE

(71) Applicant: SK hynix Inc., Gyeonggi-do (KR)

(72) Inventor: Dong Jae Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 55 days.

(21) Appl. No.: 15/644,193

(22) Filed: Jul. 7, 2017

(65) Prior Publication Data

US 2018/0217785 A1 Aug. 2, 2018

(30) Foreign Application Priority Data

Jan. 31, 2017 (KR) .......................... 10-2017-0013857

(51) Int. Cl.
*G06F 3/06* (2006.01)
(52) U.S. Cl.
CPC .......... *G06F 3/0659* (2013.01); *G06F 3/0604* (2013.01); *G06F 3/0611* (2013.01); *G06F 3/0679* (2013.01); *G06F 3/0688* (2013.01)

(58) Field of Classification Search
CPC .... G06F 3/0659; G06F 3/0679; G06F 3/0604; G06F 3/0688; G06F 3/0611
USPC ........................................................ 71/103
See application file for complete search history.

(56) References Cited

U.S. PATENT DOCUMENTS

| | | | |
|---|---|---|---|
| 2012/0272028 A1* | 10/2012 | Fukushima | G06F 12/14 711/163 |
| 2012/0297135 A1* | 11/2012 | Mathew | G06F 11/1076 711/114 |
| 2016/0085690 A1* | 3/2016 | Kim | G06F 12/1081 710/24 |
| 2016/0292007 A1* | 10/2016 | Ding | G06F 9/5011 |
| 2016/0371034 A1* | 12/2016 | Kang | G06F 3/0656 |

FOREIGN PATENT DOCUMENTS

KR 1020150116627 10/2015

* cited by examiner

*Primary Examiner* — Hashem Farrokh
(74) *Attorney, Agent, or Firm* — IP & T Group LLP

(57) ABSTRACT

A data storage device includes a nonvolatile memory device; and a controller suitable for controlling the nonvolatile memory device through a command, the controller comprising a memory controller including a queue which includes multiple slots, each of the multiple slots being mapped to one type among a plurality of types of the command, and suitable for processing a descriptor for the command enqueued to the queue to generate the command; and a processor suitable for requesting one slot of the multiple slots mapped to one type among the plurality of types of the command, to the memory controller, and enqueuing, when allocated with the one slot, the descriptor for the command, to the one slot.

8 Claims, 8 Drawing Sheets

| First queue | Mapped command |
|---|---|
| SL11 | SLC read |
| SL12 | TLC read |
| SL13 | Set parameter |
| SL14 | Get parameter |
| SL15 | Data out |
| SL16 | Oversampling read |

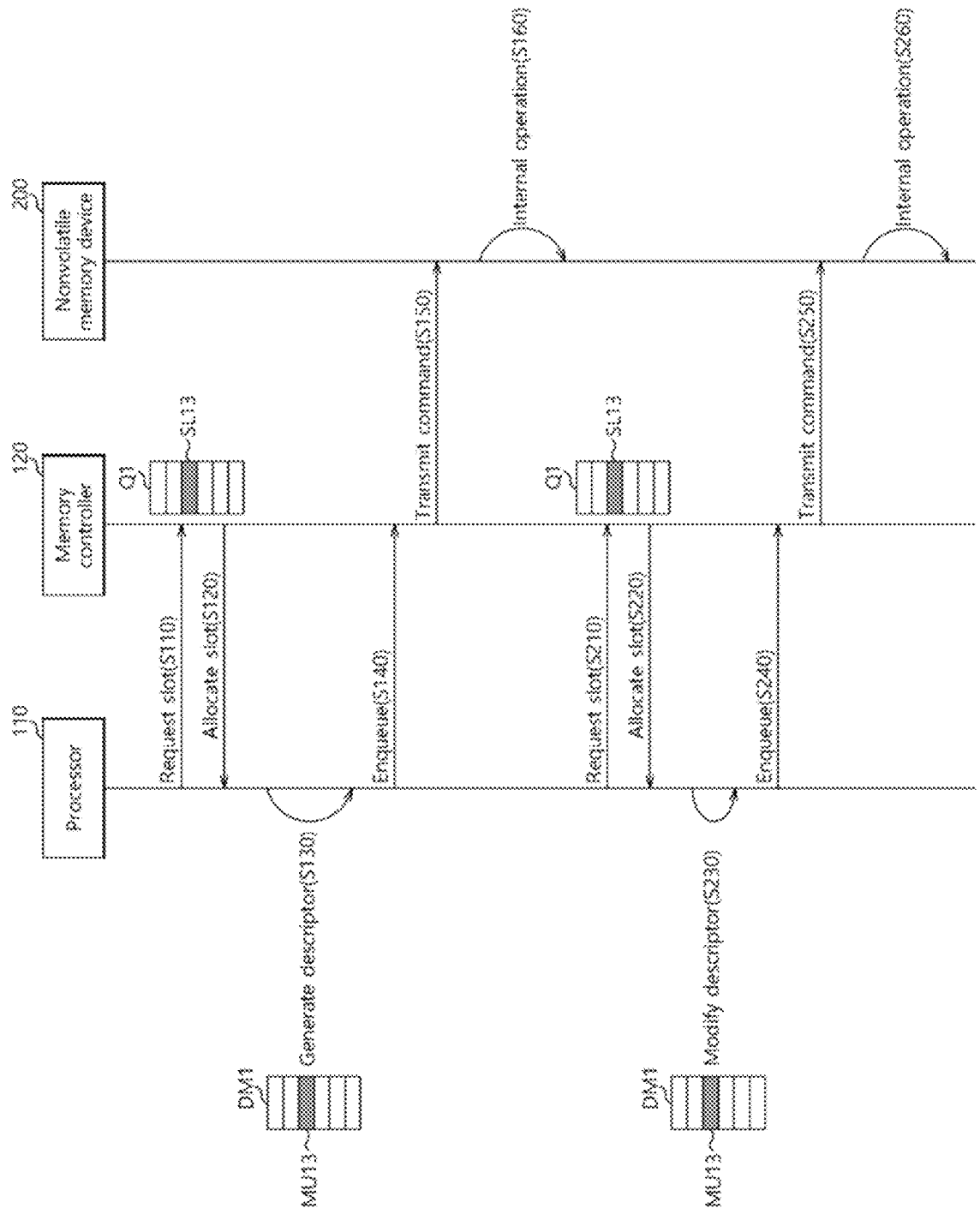

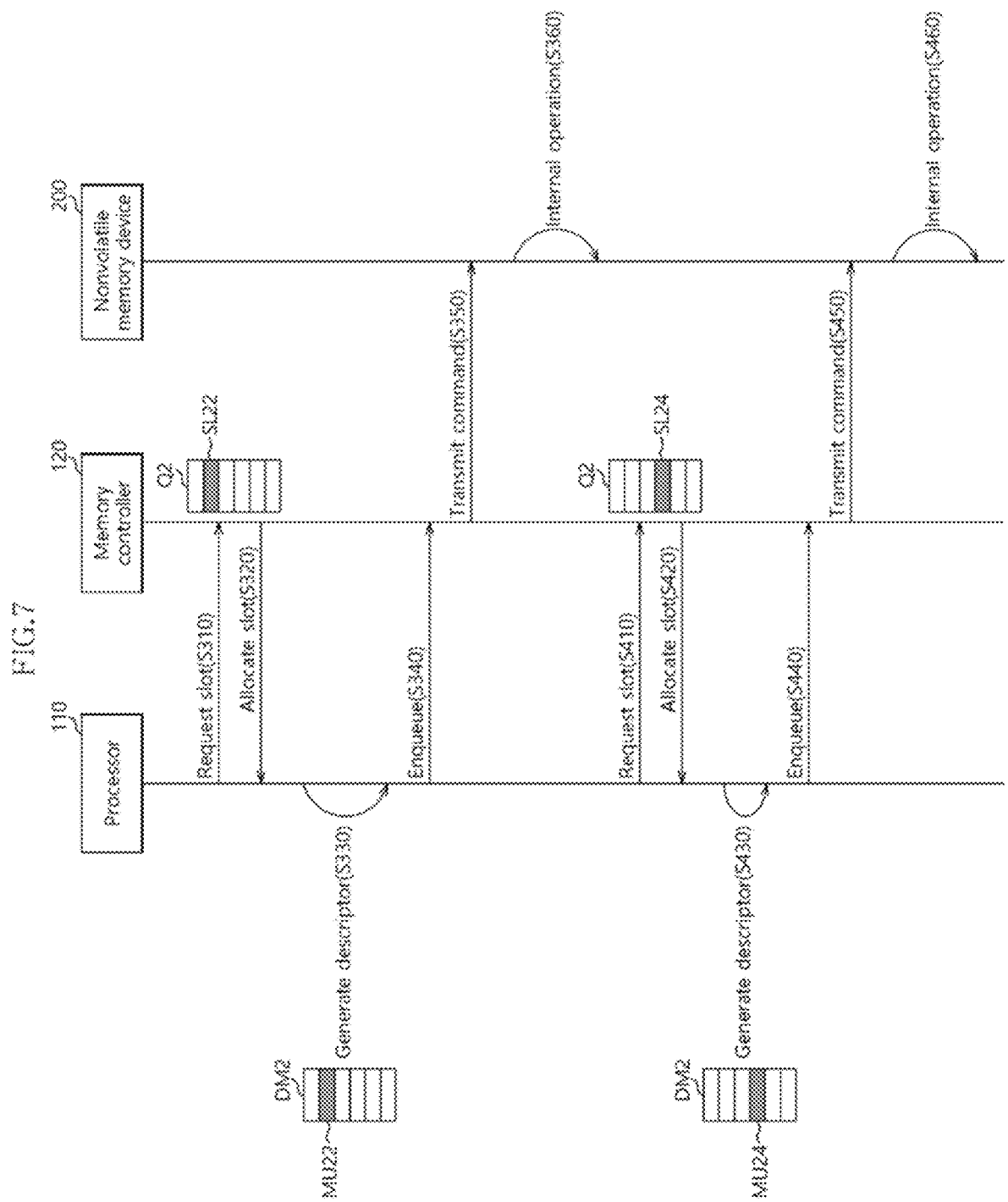

DATA STORAGE DEVICE

CROSS-REFERENCES TO RELATED APPLICATION

The present application claims priority under 35 U.S.C. § 119(a) to Korean application number 10-2017-0013857, flied on Jan. 31, 2017, in the Korean Intellectual Property Office, which is Incorporated herein by reference in its entirety.

BACKGROUND

1. Technical Field

Various embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

In an embodiment, a data storage device may include: a nonvolatile memory device; and a controller suitable for controlling the nonvolatile memory device through a command, the controller comprising a memory controller including a queue which includes multiple slots, each of the multiple slots being mapped to one type among a plurality of types of the command, and suitable for processing a descriptor for the command enqueued to the queue to generate the command; and a processor suitable for requesting one slot of the multiple slots mapped to one type among the plurality of types of the command, to the memory controller, and enqueuing, when allocated with the one slot, the descriptor for the command, to the one slot.

In an embodiment, a data storage device may include: a nonvolatile memory device; and a controller suitable for controlling the nonvolatile memory device through a command, the controller comprising a processor suitable for generating a descriptor for the command, and enqueuing the descriptor; and a memory controller suitable for processing the enqueued descriptor to generate the command, wherein, when a command of the same type as a type of the command is additionally necessary, the processor modifies the descriptor and enqueues the modified descriptor.

In an embodiment, a data storage device may include: a nonvolatile memory device; and a controller suitable for controlling the nonvolatile memory device through a command, the controller comprising a memory controller including a first queue which includes a first group slot having one or more slots and a second queue which includes a second group slot having one or more slots, and suitable for processing descriptors enqueued to the first queue and the second queue to generate the command, each of the first group slot being respectively mapped to one type among a plurality of types of the command; and a processor suitable for requesting one slot of a first slot of the first group slot in the first queue or a second slot of a second group slot in the second queue to the memory controller, and enqueuing a descriptor for the command to an allocated slot, wherein the memory controller allocates a first slot of the first group slot mapped to one type among the plurality of types of the command in the first queue in response to a request for the first queue from the processor, and allocates a second slot of the first group slot in the second queue regardless of type of the command, in response to a request for the second queue from the processor.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIG. 6 is a diagram illustrating a method for operating the data storage device of FIG. 1.

FIG. 7 is a diagram illustrating a method for operating the data storage device of FIG. 1.

DETAILED DESCRIPTION

Figure 1:
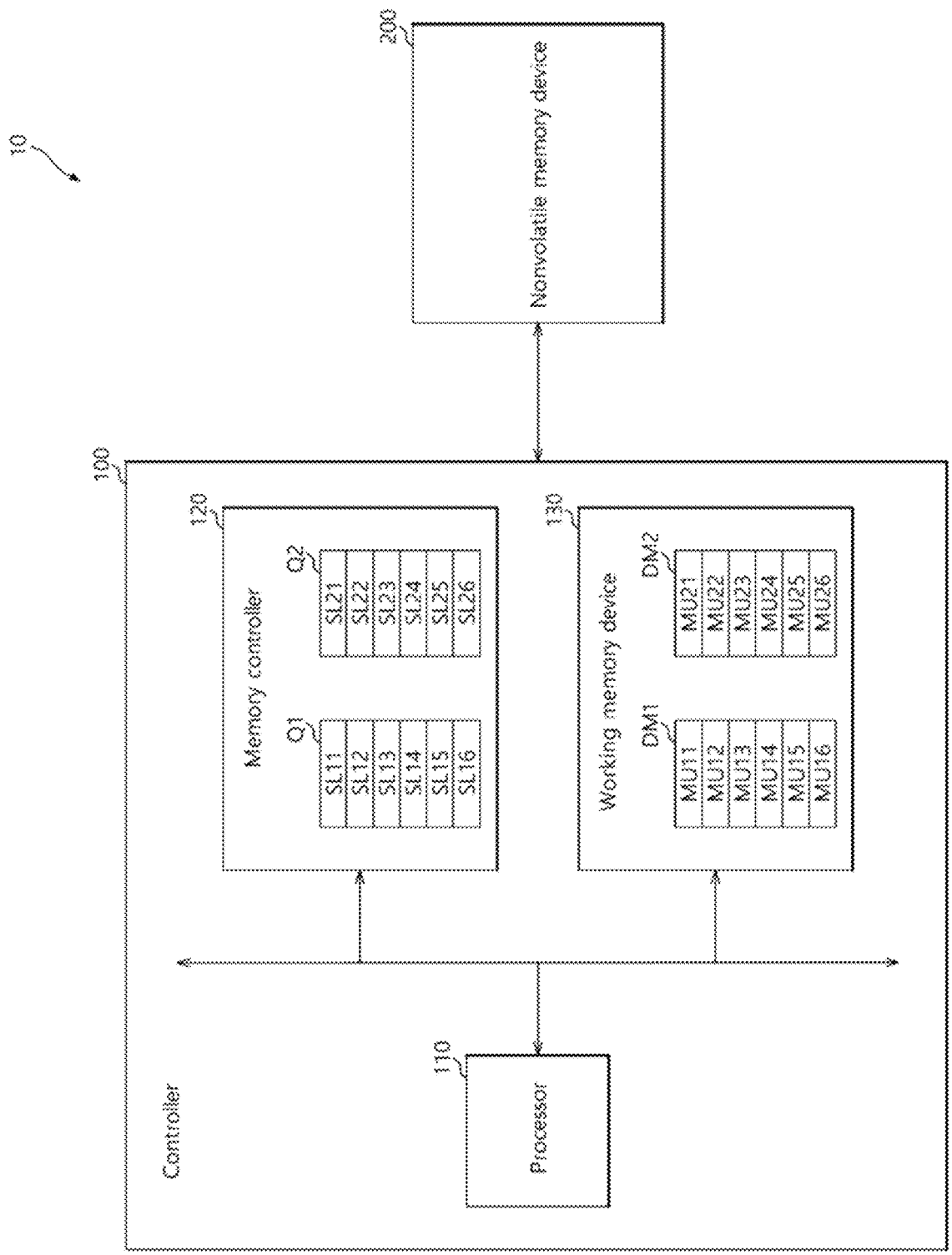
FIG. 1 is a block diagram illustrating a data storage device in accordance with an embodiment.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device in accordance with an embodiment.

The data storage device 10 may be configured to store data provided from an external device, in response to a write request from the external device. Also, the data storage device 10 may be configured to provide stored data to the external device, in response to a read request from the external device.

The data storage device 10 may be configured by a Personal Computer Memory Card International Association (PCMCIA) card, a Compact Flash (CF) card, a smart media card, a memory stick, various multimedia cards (for example, MMC, eMMC, RS-MMC, and MMC-Micro), various secure digital cards (for example, SD, Mini-SD, and Micro-SD), a Universal Flash Storage (UFS), a Solid State Drive (SSD) and the like.

The data storage device 10 may include a controller 100 and a nonvolatile memory device 200.

The controller 100 may store data in the nonvolatile memory device 200 in response to a write request received from the external device. Also, the controller 100 may read data stored in the nonvolatile memory device 200 and output read data to the external device in response to a read request received from the external device.

The controller 100 may include a processor 110, a memory controller 120, and a working memory device 130.

The processor 110 may generate a descriptor for a command to be transmitted to the nonvolatile memory device 200 by the memory controller 120, in the working memory device 130. The descriptor may include information which is necessary for the memory controller 120 to generate a command. To this end, the processor 110 may be allocated with a usable slot of a first queue Q1 or a second queue Q2 from the memory controller 120, and generate a descriptor in a first descriptor memory DM1 or a second descriptor memory DM2 corresponding to the allocated slot. The processor 110 may enqueue the descriptor to the allocated slot to allow the memory controller 120 to refer to the descriptor. Through the procedure of enqueuing the descriptor to the allocated slot, the memory controller 120 may generate a command by accessing a position of the working memory device 130 corresponding to the allocated slot and referring to the descriptor stored thereat.

The memory controller 120 may include the first queue Q1 and the second queue Q2. The first queue Q1 may include a first group slot SL11 to SL16, and the second queue Q2 may include a second group slot SL21 to SL26. The first group slot SL11 to SL16 of the first queue Q1 may correspond to first memory units MU11 to MU16, respectively, included in the first descriptor memory DM1. The second group slot SL21 to SL26 of the second queue Q2 may correspond to second memory units MU21 to MU26, respectively, included in the second descriptor memory DM2. Each of the first and second memory units MU11 to MU16 and MU21 to MU26 may be used to store a descriptor which is enqueued to a corresponding slot. While it is illustrated in FIG. 1 that the first queue Q1 and the second queue Q2 include six slots SL11 to SL16 and SL21 to SL26, respectively, it is to be noted that the number of slots is not limited thereto.

The memory controller 120 may allocate a slot which is usable in the first queue Q1 or the second queue Q2, in response to a slot request from the processor 110. The memory controller 120 may generate a command by referring to a descriptor enqueued in the corresponding slot, and transmit the command to the nonvolatile memory device 200. When a slot is usable or is completely processed may mean that a descriptor previously enqueued to the corresponding slot is completely processed, that is, all of a command generated based on the descriptor and an operation associated therewith are completed. According to an embodiment, the memory controller 120 may process the descriptors enqueued in each of the first queue Q1 and the second queue Q2, according to a round robin scheduling scheme.

According to the present embodiment, the processor 110 may initially generate only one time a descriptor for a certain command, in the first descriptor memory DM1. Then, when a command of the same type is additionally necessary, the processor 110 may additionally modify minimally the descriptor previously generated in the first descriptor memory DM1 and reuse the modified descriptor. Thereafter, as the modified descriptor is enqueued to the first queue Q1, the memory controller 120 may generate the command of the same type by referring to the modified descriptor, and transmit the generated command to the nonvolatile memory device 200.

Figures 2, 3:
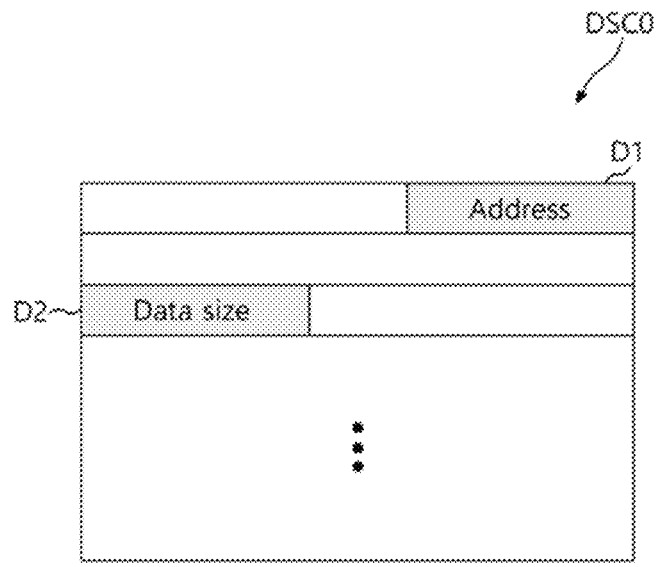
FIG. 2 is a diagram illustrating an example of a descriptor stored in a first descriptor memory.
FIG. 3 is a diagram illustrating an example of command types mapped to first group slot of a first queue of FIG. 1.

FIG. 2 is a diagram illustrating an example of a descriptor DSC0 stored in the first descriptor memory DM1 of FIG. 1.

The descriptor DSC0 may be, for example, a read descriptor for a read command. The processor 110 of FIG. 1 may initially generate only one time the read descriptor DSC0 in the first descriptor memory DM1. After the read descriptor DSC0 is completely processed, the processor 110 may need a subsequent read command. In this case, the processor 110 may modify, for example, Information D1 on an address to be read and information D2 on a size of data to be read, in the read descriptor DSC0, and enqueue the modified descriptor DSC0.

Referring again to FIG. 1, for such a reuse of a descriptor, the first group slot SL11 to SL16 of the first queue Q1 may be mapped to different command types, respectively. The processor 110 may request a slot mapped to a certain command, for example, a read command, in the first queue Q1. The memory controller 120 may allocate a slot mapped to the certain command, for example, the read command, in the first queue Q1, to the processor 110 in response to the request of the processor 110. As a result, since a memory unit corresponding to the allocated slot in the first descriptor memory DM1 may continuously retain a descriptor for the certain command, for example, a read descriptor for the read command, the processor 110 may continuously reuse the corresponding read descriptor.

According to an embodiment, a time at which each of the first group slot SL11 to SL16 of the first queue Q1 is mapped to a specific command type may be a time when the memory controller 120 randomly allocates any one slot which is not mapped yet to any command type, among the first group slot SL11 to SL16, in response to a slot request of the processor 110.

Furthermore, the second group slot SL21 to SL26 of the second queue Q2 may not be mapped to any command types. Therefore, a descriptor for a different type of a command may be enqueued each time to each of the second group slot SL21 to SL26 of the second queue Q2. The processor 110 may simply request a usable slot of the second queue Q2 to the memory controller 120 to generate a descriptor, and the memory controller 120 may allocate any one slot which is usable among the second group slot SL21 to SL26 of the second queue Q2, to the processor 110. Each time the processor 110 is allocated with a slot of the second queue Q2, the processor 110 may generate from the beginning a descriptor in a memory unit of the second descriptor memory DM2 corresponding to the allocated slot, and enqueue the descriptor to the allocated slot.

According to an embodiment, the first queue Q1 may be used in a read error recovery process. The read error recovery process may be performed by providing various commands for a read bias change operation, and hard decision and soft decision error correction operations, to the nonvolatile memory device 200, to succeed in an error correction operation when an error correction operation for data read from the nonvolatile memory device 200 fails. In this case, the first group slot SL11 to SL16 of the first queue Q1 may be respectively mapped to all predetermined types of commands used in the read error recovery process.

Most commands used in the read error recovery process may be determined in terms of whether or not to be performed, only when processing results of previous commands thereof are referred to. That is, the processor 110 may determine a necessary command by referring to a processing result of a previous command, and enqueue a descriptor for the determined command, to the first queue Q1. Thus, in the read error recovery process, instead of a plurality of descriptors being simultaneously enqueued to the first queue Q1, it may be that one descriptor is enqueued at a time. In this regard, since a descriptor is generated from the beginning each time the descriptor is enqueued, it is clear that a substantially long time will be required for the read error recovery process.

However, according to the present embodiment, due to the first group slot SL11 to SL16 of the first queue Q1 being respectively mapped to all types of commands used in the read error recovery process, descriptors for the corresponding commands may be reused with minimal modification. Therefore, since a descriptor generation time is significantly shortened, a time for performing the read error recovery process may be effectively shortened, and the overhead of the processor 110 may be reduced.

According to an embodiment, the second queue Q2 may not be used for the read error recovery process but for normal operations. For example, the second queue Q2 may be used to process commands for accessing the nonvolatile memory device 200, in response to requests from the external device.

As described above, even though the processor 110 generates a descriptor from the beginning each time the descriptor is enqueued to the second queue Q2, a plurality of descriptors may have been simultaneously enqueued to the second queue Q2, and the memory controller 120 may process the descriptors enqueued simultaneously to the second queue Q2, in a predetermined scheduling scheme for example, a round robin scheduling scheme. Such a scheme may provide high processing speeds for normal operations, by maximizing the use of the second queue Q2 with a limited capacity of the second descriptor memory DM2.

The working memory device 130 may include the first descriptor memory DM1 and the second descriptor memory DM2. The first descriptor memory DM1 and the second descriptor memory DM2 may include the first memory units MU11 to MU16 and the second memory units MU21 to MU26, respectively. While it is illustrated in FIG. 1 that the first and second descriptor memories DM1 and DM2 include six memory units MU11 to MU16 and MU21 to MU26, respectively, it is to be noted that the number of memory units is not limited thereto.

The working memory device 130 may be a volatile memory device such as a Static Random Access Memory (SRAM) and a Dynamic Random Access Memory (DRAM). Since the memory units MU11 to MU16 are volatile, they may retain reused descriptors till a power-off. Thus, till a power-off, descriptors may be reused each time the read error recovery process is entered.

According to an embodiment, the working memory device 130 may be a nonvolatile memory device such as a flash memory for example, a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

The nonvolatile memory device 200 may store data received from the controller 100 and may read stored data and transmit read-out data to the controller 100, according to control of the controller 100. The nonvolatile memory device 200 may perform an internal operation in response to a command which is generated and transmitted by the memory controller 120.

The nonvolatile memory device 200 may Include a flash memory for example, a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the data storage device includes one nonvolatile memory device 200, it is to be noted that the number of nonvolatile memory devices included in the data storage device 10 is not limited thereto.

FIG. 3 is a diagram illustrating an example of command types mapped to the first group slot SL11 to SL16 of the first queue Q1 of FIG. 1.

Referring to FIG. 3, the first group slot SL11 to SL16 may be respectively mapped to different commands for the read error recovery process. For example, the commands for the read error recovery process includes a single level cell (SLC) read command, a triple level cell (TLC) read command, a set parameter command, a get parameter command, a data out command and an oversampling read command. The mapping shown in FIG. 3 may be set in advance or be set when the memory controller 120 initially allocates a slot in response to a slot request of the processor 110.

Figure 4A:
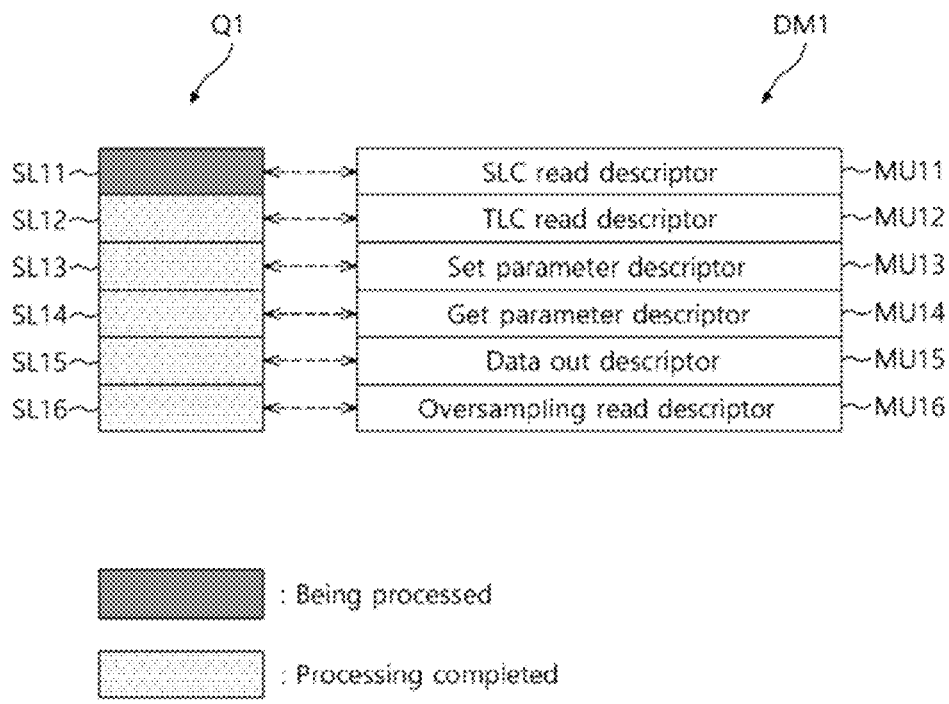
FIGS. 4A and 4B are diagrams illustrating examples of a method for a memory controller to allocate a first group slot of a first queue to a processor.
Figure 4B:
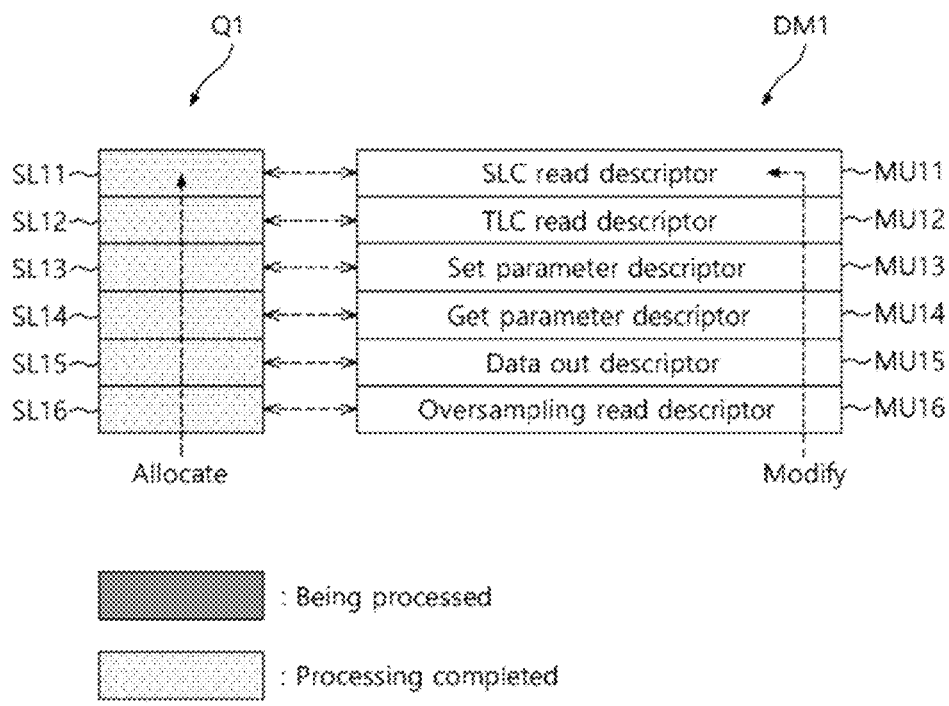

FIGS. 4A and 4B are diagrams illustrating examples of a method for the memory controller 120 to allocate a first group slot SL11 to SL16 of the first queue Q1 to the processor 110, in FIG. 1. FIGS. 4A and 4B illustrate the first group slot SL11 to SL16 of the first queue Q1 and the first memory units MU11 to MU16 of the first descriptor memory DM1 corresponding to the first group slot SL11 to SL16, respectively.

Referring to FIG. 4A, a single level cell (SLC) read descriptor, a triple level cell (TLC) read descriptor, a set parameter descriptor, a get parameter descriptor, a data out descriptor and an oversampling read descriptor may be retained in the first memory units MU11 to MU16, respectively, according to the mapping shown in FIG. 3. For example, since the slot SL11 is mapped to the SLC read command, the first memory unit MU11 corresponding to the slot SL11 may retain the SLC read descriptor for the SLC read command.

In FIG. 4A, the slot SL11 of the first group slot may be in a state in which it is currently being processed, and the other slots SL12 to SL16 of the first group slot SL11 to SL16 may be in a state in which they are completely processed. That is, the other slots SL12 to SL16 may be in a state in which they may be used. When the processor 110 needs the SLC read command and requests the slot SL11 mapped to the SLC read command, the memory controller 120 may not allocate the slot SL11 which is currently being processed, to the processor 110. Moreover, even though the other slots SL12 to SL16 are in a state in which they may be used, the memory controller 120 may not allocate the other slots SL12 to SL16 which retain the descriptors for the commands other than the SLC read command, to the processor 110.

Referring to FIG. 4B, the slot SL11 may be in a state in which it is completely processed. When the processor 110 requests the slot SL11 corresponding to the SLC read command, the memory controller 120 may allocate the slot SL11 which is completely processed, to the processor 110. When allocated with the slot SL11, the processor 110 may minimally modify the SLC read descriptor stored in the first memory unit MU11, and enqueue the modified SLC read descriptor to the slot SL11.

Figure 5A:
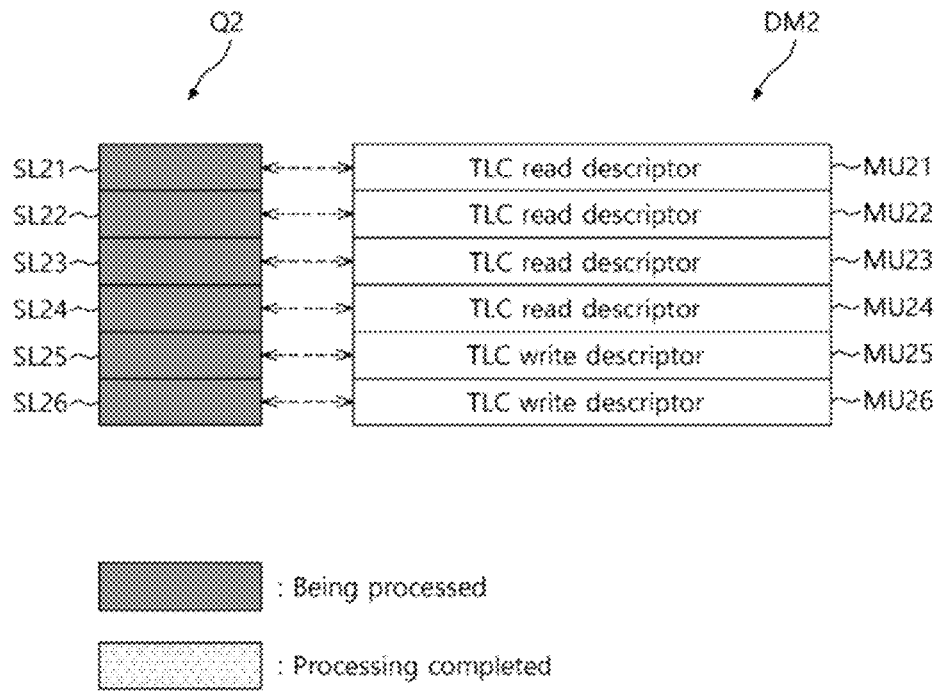
FIGS. 5A and 5B are diagrams illustrating examples of a method for a memory controller to allocate a second group slot of a second queue to a processor.
Figure 5B:
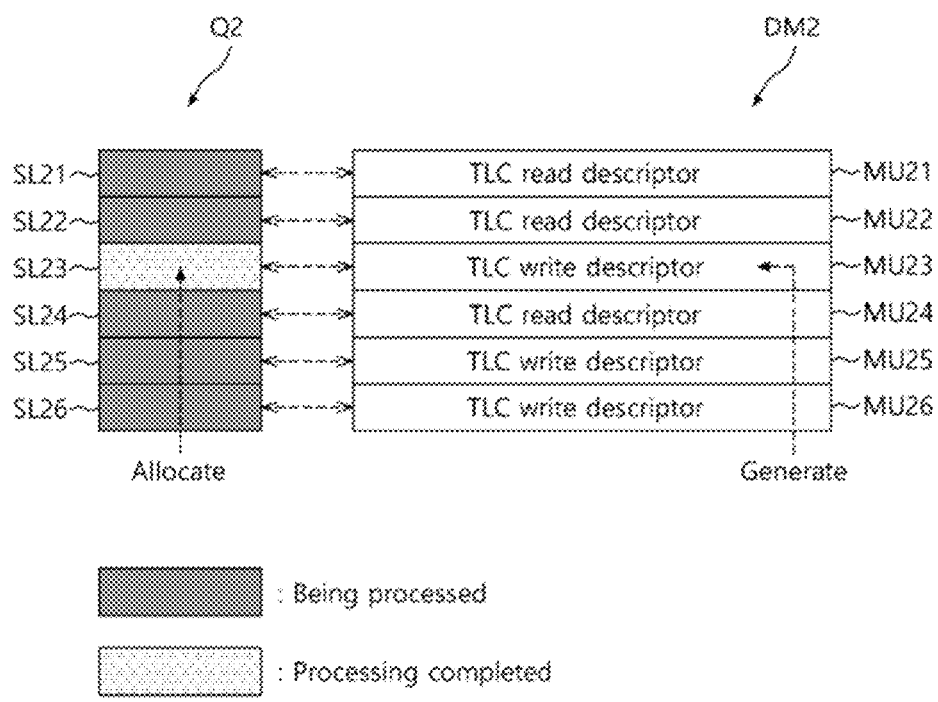

FIGS. 5A and 5B are diagrams Illustrating examples of a method for the memory controller 120 to allocate a second group slot SL21 to SL26 of the second queue Q2 to the processor 110, in FIG. 1. FIGS. 5A and 5B illustrate the second group slot SL21 to SL26 of the second queue Q2 and the second memory units MU21 to MU26 of the second descriptor memory DM2 corresponding to the second group slot SL21 to SL26, respectively.

Referring to FIG. 5A, TLC read descriptors and TLC write descriptors may be stored in the second memory units MU21 to MU26, respectively. Since the second group slot SL21 to SL26 of the second queue Q2 are not mapped to any specific command types, they may be allocated randomly. Accordingly, descriptors stored in the second memory units MU21 to MU26 may not be limited by command types. The second group slot SL21 to SL26 may be in a state in which they are currently being processed.

Referring to FIG. 5B, one slot SL23 of the second group slot SL21 to SL26 may be in a state in which it is completely processed. At this time, if the processor 110 requests a slot usable in the second queue Q2 to generate, for example, a TLC write descriptor, the memory controller 120 may allocate the slot SL23 usable among the second group slot SL21 to SL26, to the processor 110. Even though the slot SL23 is previously allocated for a TLC read descriptor, it may be allocated currently for the TLC write descriptor. When allocated with the slot SL23, the processor 110 may generate the TLC write descriptor in the second memory unit MU23 corresponding to the slot SL23, and enqueue the TLC write descriptor to the slot SL23.

FIG. 6 is a flow chart Illustrating a method for operating the data storage device 10 of FIG. 1. FIG. 6 illustrates a procedure in which descriptors are enqueued to the first queue Q1 and are then processed. FIG. 6 may Illustrate a procedure in which the read error recovery process is performed.

At step S110, the processor 110 may determine that a predetermined command is necessary for the nonvolatile memory device 200. To initially generate a descriptor for the predetermined command, the processor 110 may request a slot mapped to a type of the predetermined command in the first queue Q1, to the memory controller 120.

At step S120, the memory controller 120 may allocate a slot mapped to the type of the predetermined command in the first queue Q1, for example, a slot SL13, to the processor 110.

At step S130, the processor 110 may generate a descriptor for the predetermined command, in a memory unit MU13 of the first descriptor memory DM1 corresponding to the allocated slot SL13.

At step S140, the processor 110 may enqueue the generated descriptor to the allocated slot SL13.

At step S150, the memory controller 120 may generate the predetermined command by referring to the descriptor, and transmit the generated predetermined command to the nonvolatile memory device 200.

At step S160, the nonvolatile memory device 200 may perform an internal operation in response to the command from the memory controller 120.

At step S210, the processor 110 may determine that a predetermined command of the same type is necessary again for the nonvolatile memory device 200, and may request the slot SL13 mapped to the type of the predetermined command in the first queue Q1, to the memory controller 120.

At step S220, when it is determined that the slot SL13 mapped to the type of the predetermined command in the first queue Q1 is usable, the memory controller 120 may allocate the corresponding slot SL13 to the processor 110. The slot SL13 mapped to the type of the predetermined command may be determined to be usable, when the previously enqueued descriptor is completely processed.

At step S230, the processor 110 may modify the descriptor retained in the memory unit MU13 of the first descriptor memory DM1 corresponding to the allocated slot SL13. A time for modifying a descriptor may be shorter than a time for generating a descriptor.

At step S240, the processor 110 may enqueue the modified descriptor to the allocated slot SL13.

At step S250, the memory controller 120 may generate the predetermined command by referring to the descriptor, and transmit the generated predetermined command to the nonvolatile memory device 200.

At step S260, the nonvolatile memory device 200 may perform an internal operation in response to the command from the memory controller 120.

Therefore, descriptors processed in the read error recovery process may be reused through minimal modification. Since a descriptor generation time is significantly shortened, a time for performing the read error recovery process may be effectively shortened, and the overhead of the processor 110 may be reduced.

FIG. 7 is a flow chart illustrating a method for operating the data storage device 10 of FIG. 1. FIG. 7 illustrates a procedure in which descriptors are enqueued to the second queue Q2 and are then processed. FIG. 7 may illustrate a procedure in which normal operations are performed.

At step S310, the processor 110 may request a slot usable in the second queue Q2, to the memory controller 120, to generate a descriptor for a predetermined command.

At step S320, the memory controller 120 may allocate a slot usable in the second queue Q2, for example, a slot SL22, to the processor 110.

At step S330, the processor 110 may generate a descriptor for the predetermined command, in a memory unit MU22 of the second descriptor memory DM2 corresponding to the allocated slot SL22.

At step S340, the processor 110 may enqueue the generated descriptor to the allocated slot SL22.

At step S350, the memory controller 120 may generate the predetermined command by referring to the descriptor, and transmit the generated predetermined command to the nonvolatile memory device 200.

At step S360, the nonvolatile memory device 200 may perform an internal operation in response to the command from the memory controller 120.

At step S410, the processor 110 may request a slot usable in the second queue Q2, to the memory controller 120, to generate a descriptor for a predetermined command of the same type.

At step S420, the memory controller 120 may allocate a slot usable in the second queue Q2, for example, a slot SL24, to the processor 110.

At step S430, the processor 110 may generate a descriptor for the predetermined command, in a memory unit MU24 of the second descriptor memory DM2 corresponding to the allocated slot SL24.

At step S440, the processor 110 may enqueue the generated descriptor to the allocated slot SL24.

At step S450, the memory controller 120 may generate the predetermined command by referring to the descriptor, and transmit the generated predetermined command to the nonvolatile memory device 200.

At step S460, the nonvolatile memory device 200 may perform an internal operation in response to the command from the memory controller 120.

Furthermore, it is apparent that even the slot SL22 may be allocated subsequently for a descriptor of another command type. Thus, descriptors to be enqueued to the second queue Q2 may be generated from the beginning every time they are enqueued.

Figure 8:
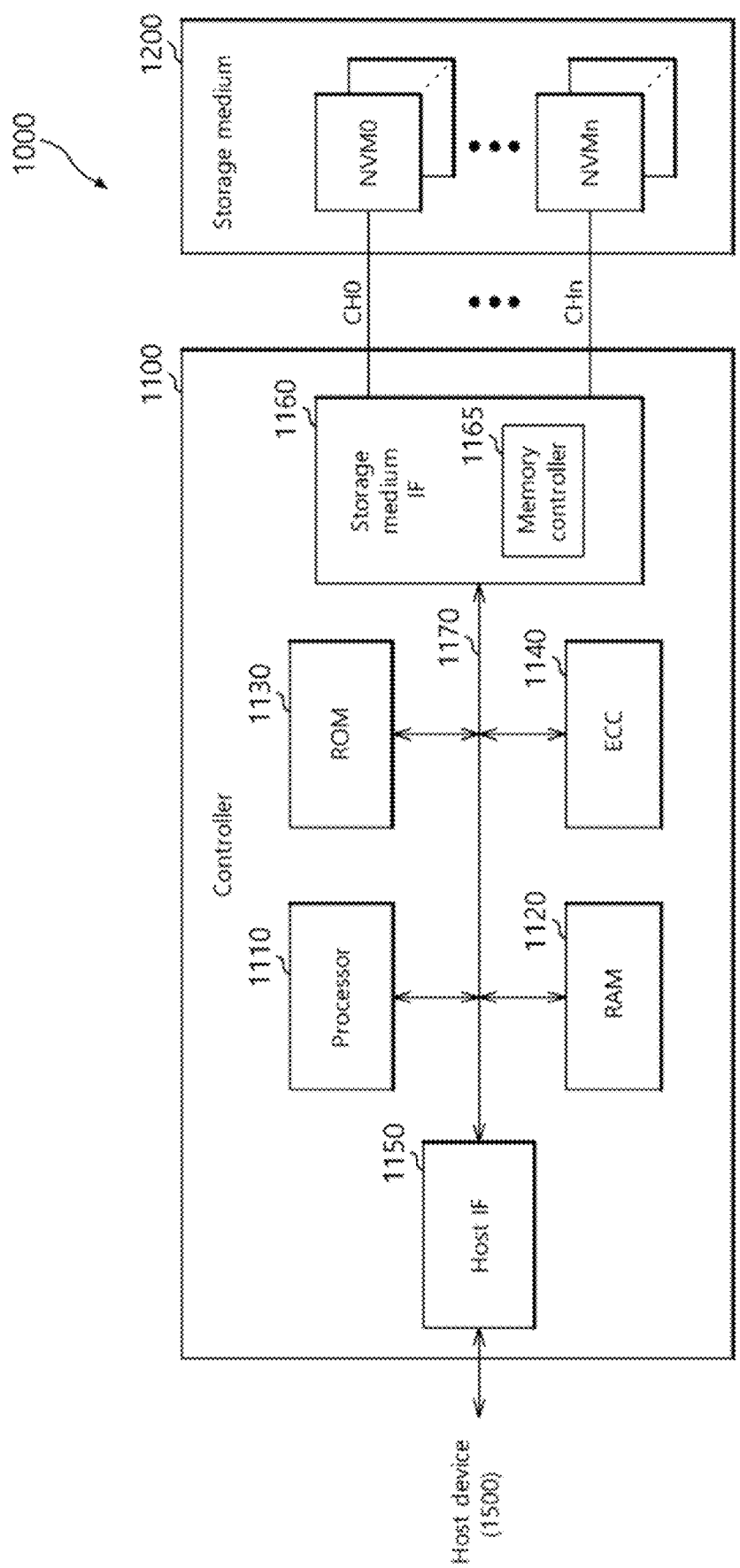
FIG. 8 is a block diagram illustrating a solid state drive (SSD) in accordance with an embodiment.

FIG. 8 is a block diagram illustrating a solid state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface (IF) 1150 and a storage medium interface (IF) 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may operate substantially similarly to the processor 110 of FIG. 1. That is, the processor 1110 may request a slot to a memory controller 1165, and enqueue a descriptor to an allocated slot. When performing a read error recovery process, the processor 1110 may be allocated with a slot mapped to a command type, modify a descriptor retained in a memory unit corresponding to the allocated slot, and enqueue the modified descriptor. The processor 1110 may initially generate only one time a descriptor for a certain command, in a memory unit corresponding to a slot mapped to a type of a command.

The RAM 1120 may store programs and program data to be used by the processor 1110. The RAM 1120 may temporarily store data received from the host interface 1150 before transferring it to the storage medium 1200, and may temporarily store data received from the storage medium 1200 before transferring it to the host device 1500. The RAM 1120 may operate substantially similarly to the working memory device 130 of FIG. 1. The RAM 1120 may retain the descriptor generated by the processor 1110.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error which occurred in data, according to an ECC algorithm.

The host interface 1150 may exchange data processing requests, data, etc. with the host device 1500.

The storage medium interface 1160 may transmit control signals and data to the storage medium 1200. The storage medium Interface 1160 may receive data from the storage medium 1200. The storage medium interface 1160 may be coupled with the storage medium 1200 through a plurality of channels CH0 to CHn.

The storage medium interface 1160 may include the memory controller 1165. The memory controller 1165 may operate in a manner substantially similar to the memory controller 120 of FIG. 1. The memory controller 1165 may include a first queue for the read error recovery process and a second queue for normal operations. The memory controller 1165 may allocate a slot mapped to a command in the first queue, in response to a request for a slot of the first queue of the processor 1110. Also, the memory controller 1165 may allocate a slot usable regardless of a type of a command in the second queue, in response to a request for a slot of the second queue of the processor 1110.

The storage medium 1200 may include the plurality of nonvolatile memory devices NVM0 to NVMn. Each of the plurality of nonvolatile memory devices NVM0 to NVMn may perform a write operation and/or a read operation according to control of the controller 1100.

Figure 9:
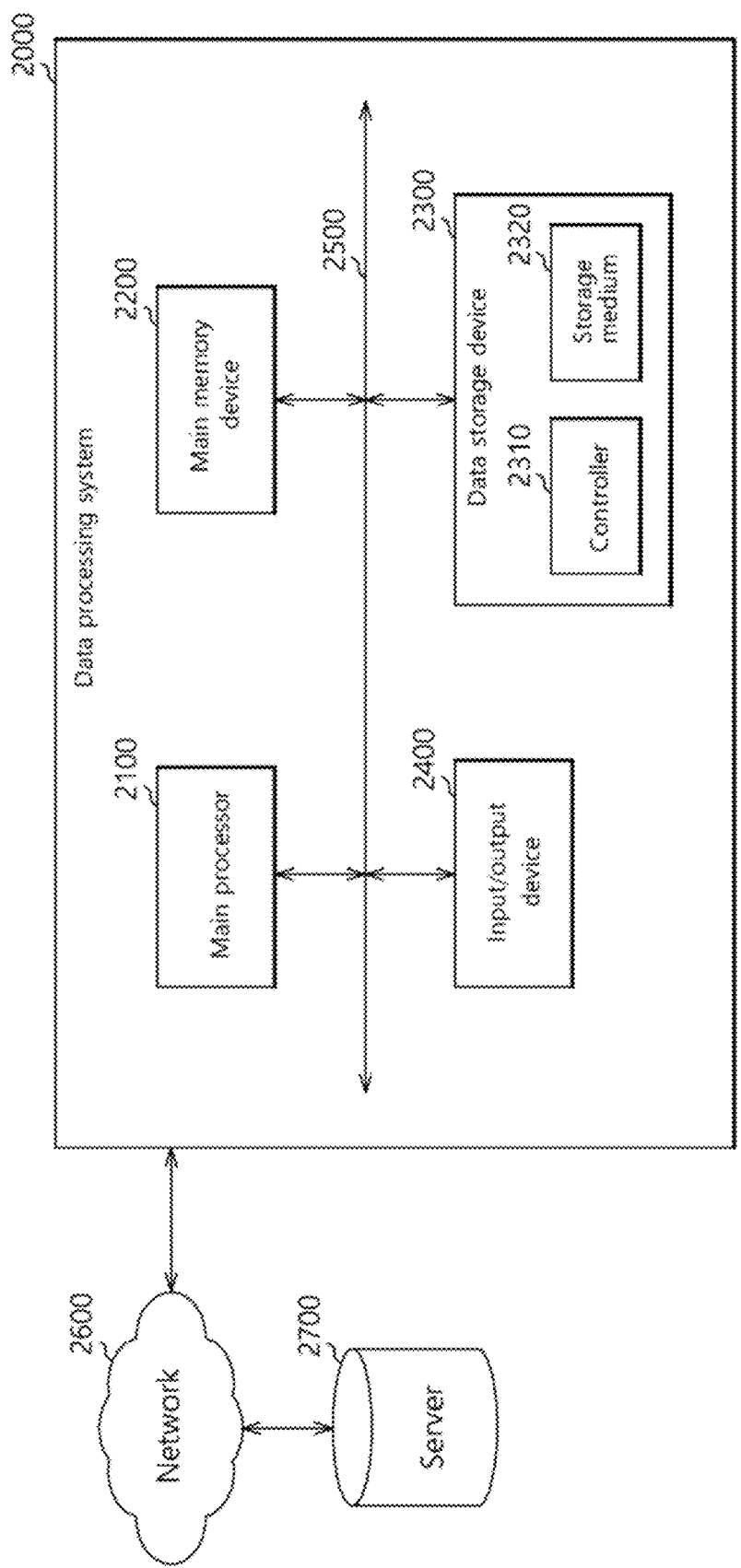
FIG. 9 is a block diagram illustrating a data processing system to which the data storage device in accordance with the embodiment is applied.

FIG. 9 is a block diagram Illustrating a data processing system 2000 to which the data storage device 10 in accordance with the embodiment is applied.

The data processing system 2000 may include a computer, a laptop, a netbook, a smart phone, a digital television (TV), a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, such as a microprocessor. The main processor 2100 may execute software such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
a nonvolatile memory device; and
a controller suitable for controlling the nonvolatile memory device through a command,
the controller comprising
a memory controller including a queue which includes multiple slots, each of the multiple slots being mapped to one type among a plurality of types of the command, and suitable for processing a descriptor for the command enqueued to the queue to generate the command;
a descriptor memory including multiple memory units; and
a processor suitable for requesting one slot of the multiple slots mapped to a first type among the plurality of types of a first command to be generated by the memory controller, to the memory controller, generating a first descriptor for the first command in a first memory unit mapped to the one slot of the multiple memory units when allocated with the one slot, and enqueuing the first descriptor to the one slot,
wherein when a second command of the first type is needed to be generated by the memory controller additionally, the processor requests the one slot to the memory controller, modifies the first descriptor stored in the first memory unit when allocated with the one slot, and enqueues the modified first descriptor for the second command to the one slot, and
wherein the multiple slots are respectively mapped to different types of command used in a read error recovery process that is performed to succeed in an error correction operation for data read from the nonvolatile memory device.

2. The data storage device according to claim 1, wherein the memory controller, in response to a request for the one slot from the processor, allocates the one slot to the processor when a descriptor previously enqueued to the one slot is completely processed.

3. The data storage device according to claim 1, wherein the types of command used in the read error recovery process are a read command, a set parameter command, a get parameter command, a data out command and an oversampling read command.

4. A data storage device comprising:
a nonvolatile memory device; and
a controller suitable for controlling the nonvolatile memory device through a command,
the controller comprising
a memory controller including a first queue having one or more slots and a second queue having one or more slots, and suitable for processing descriptors enqueued to the first queue and the second queue to generate commands, the slots of the first queue being respectively mapped to different types of a command used in a read error recovery process that is performed to succeed in an error correction operation for data read from the nonvolatile memory device;
a descriptor memory including multiple memory units; and
a processor suitable for requesting one slot in the first queue or the second queue to the memory controller, generating a descriptor in a memory unit that corresponds to an allocated slot of the multiple memory units, and enqueuing the descriptor to the allocated slot,
wherein a processor requests a slot in the first queue to the memory controller to perform the read error recovery process with a first command, and requests a slot in the second queue to the memory controller to perform a normal operation with a second command,
wherein the memory controller allocates a first slot in the first queue mapped to one type of the first command among the types in response to a request for the slot in the first queue from the processor, and does not allocate a usable slot in the first queue not mapped to the one type of the first command, and wherein the memory controller allocates a second slot among usable slots in the second queue regardless of type of the second command in response to a request for the slot in the second queue from the processor.

5. The data storage device according to claim 4, wherein the multiple memory units comprises a first multiple memory units, each of the first multiple memory units corresponds to a corresponding slot in the first queue, and a second multiple memory units, each of the second multiple memory units corresponds to a corresponding slot in the second queue, and wherein each of the first and second multiple memory units stores a descriptor which is enqueued to a corresponding slot in the first and second queues.

6. The data storage device according to claim 4, wherein, when a command of the same type as the type of the first command is additionally necessary in the read error recovery process, the processor requests the first slot in the first queue, and, when allocated with the first slot, modifies a descriptor stored in a memory unit corresponding to the first slot and enqueues the modified descriptor to the first slot.

7. The data storage device according to claim 4, wherein the memory controller allocates the first slot in response to the request for the slot in the first queue from the processor, when a descriptor previously enqueued to the first slot is completely processed.

8. The data storage device according to claim 4, wherein the types of command used in the read error recovery process are a read command, a set parameter command, a get parameter command, a data out command and an oversampling read command.

* * * * *